(12) United States Patent
Seifert (10) Patent No.: US 12,494,278 B2
(45) Date of Patent: Dec. 9, 2025

(54) METHOD FOR CONTROLLING AT LEAST ONE ACTUATOR OF AN ORTHOPEDIC DEVICE, AND ORTHOPEDIC DEVICE

(71) Applicant: OTTO BOCK HEALTHCARE PRODUCTS GMBH, Vienna (AT)

(72) Inventor: Dirk Seifert, Vienna (AT)

(73) Assignee: Otto Bock Healthcare Products GmbH, Vienna (AT)

( * ) Notice: Subject to any disclaimer, the term of this patent is extended or adjusted under 35 U.S.C. 154(b) by 108 days.

(21) Appl. No.: 17/997,175

(22) PCT Filed: Apr. 27, 2021

(86) PCT No.: PCT/EP2021/060922
§ 371 (c)(1),
(2) Date: Oct. 26, 2022

(87) PCT Pub. No.: WO2021/219596
PCT Pub. Date: Nov. 4, 2021

(65) Prior Publication Data
US 2023/0197242 A1  Jun. 22, 2023

(30) Foreign Application Priority Data
Apr. 28, 2020 (DE) .................. 10 2020 111 535.0

(51) Int. Cl.
*G16H 20/40* (2018.01)
(52) U.S. Cl.
CPC .................. *G16H 20/40* (2018.01)
(58) Field of Classification Search
CPC ..................................... G16H 20/40
See application file for complete search history.

(56) References Cited

U.S. PATENT DOCUMENTS 5,383,939 A    1/1995   James
8,828,093 B1   9/2014   Kuiken et al.
(Continued)

FOREIGN PATENT DOCUMENTS

DE   692 09 476 T2      9/1992
DE   10 2009 056 466 A1 6/2011
EP   2 506 807 B1       1/2016

OTHER PUBLICATIONS

Bhuiyan et al.; "Development of a control system for artificially rehabilitated limbs: a review"; Biological Cybernetics, vol. 109, No. 2, Dec. 10, 2014, pp. 141-162.

*Primary Examiner* — Jay M. Patel
(74) *Attorney, Agent, or Firm* — WCF IP (57) ABSTRACT

The invention relates to a method for controlling at least one actuator (4) of an orthopedic device (2) with an electronic control device (E), which is coupled to the actuator (4) and at least one sensor (8) and which has an electronic processor (μC) for processing sensor data (s), wherein at least one state machine (SM) in which states (z) of the orthopedic device (2) and state transitions of the actuator (4) are determined is stored in the control device (E), wherein a classifier (K) in which sensor data (s) and/or states (z) are automatically classified within the scope of a classification method is stored in the control device (E), wherein the state machine (SM) and the classification method are used in combination and, on the basis of the classification and the states (z), a decision is made about the manner of activating or deactivating the actuator (4) as a control signal.

10 Claims, 6 Drawing Sheets

(56) References Cited

U.S. PATENT DOCUMENTS

| | | |
|---|---|---|
| 9,443,203 B2* | 9/2016 | Young .................... G06N 20/00 |
| 10,335,294 B2* | 7/2019 | Huang ...................... A61F 2/60 |
| 10,543,111 B2 | 1/2020 | Engeberg |
| 2005/0182389 A1* | 8/2005 | LaPorte ................... A61N 1/30 |
| | | 604/890.1 |
| 2012/0310370 A1 | 12/2012 | Huang et al. |
| 2014/0128992 A1 | 5/2014 | Engeberg |
| 2015/0190250 A1* | 7/2015 | Braun ...................... A61F 2/72 |
| | | 623/25 |
| 2015/0262076 A1* | 9/2015 | Young ................... G06N 20/00 |
| | | 706/12 |
| 2017/0119551 A1* | 5/2017 | Huang ...................... A61F 2/72 |
| 2022/0054043 A1* | 2/2022 | Albrecht-Laatsch ....................... |
| | | G16H 50/70 |

\* cited by examiner

METHOD FOR CONTROLLING AT LEAST ONE ACTUATOR OF AN ORTHOPEDIC DEVICE, AND ORTHOPEDIC DEVICE

The invention relates to a method for controlling at least one actuator of an orthopedic device, with an electronic control device which is coupled to the actuator and to at least one sensor and has an electronic processor for processing sensor data, at least one state machine being stored in the control device, in which states of the orthopedic device and state transitions of the actuator are determined. The invention also relates to an orthopedic device with an electronic control device which is coupled to an actuator and to at least one sensor and has an electronic processor for processing sensor data, with at least one classification based on sensor data or on data calculated therefrom being effected in the control device. Prostheses and orthoses are in particular considered as orthopedic devices, although in principle the latter may also include other devices such as exoskeletons or the like.

Prostheses replace limbs that are not present or that are no longer present, replacing them in terms of their function and possibly also in terms of their external appearance. Prostheses are attached to remaining limbs, for example stumps. This can be done, for example, via prosthesis sockets which surround the corresponding stump and on which further prosthesis components are arranged. As an alternative to prosthesis sockets, prostheses can also be fixed directly to a stump, for example via osseointegrated fastening devices. Orthoses are applied to existing limbs and are able to support the user in a variety of ways. The execution of movements can be guided. Movements can be supported by drives, or resistance devices can be braked. It is likewise possible that certain movements are prevented or that weaknesses within the locomotor system are compensated. Orthopedic devices often have joints or articulated components, the movement of which is influenced by actuators. The actuators can be part of a passive resistance device and can be designed as dampers, brakes or other resistance devices. To activate or deactivate them, actuators are provided with which the behavior of the resistance device can be changed, for example by adjusting valves in damper devices, by changing viscosities in magnetorheological fluids, or by increasing a contact pressure in mechanical brakes. Alternatively, configurations as active or semi-active components are provided which have drives as actuators in order to execute, support or counteract movements. Actuators are activated and deactivated via control signals with which, for example, motors are activated, magnetic fields are changed or slides are opened or closed.

State machines, which are stored in control devices, are used to control the movement behavior, for example of prostheses of the lower extremities. On the basis of received sensor data, it is ascertained in which state the prosthesis is located and how an actuator has to be activated or deactivated in order to generate a certain movement behavior. For example, valves are partially or completely closed via an electric motor, in order to change the cross section of fluidic connections or to close the latter, so as to influence or prevent pivoted movements of a joint. The control works with what are called state machines, which have a network structure. By virtue of an assumption or knowledge of the current state, the setting or adjustment possibilities for adaptation to the next expected state or to the next expected states are reduced. A control for a prosthetic knee joint via a state machine is described, for example, in EP 549 855 B1.

Pattern recognition methods, with which EMG signals are processed for control, are used in particular in orthopedic devices for the upper extremity. The pattern recognition methods often have stochastic features and can be adapted to the needs of the individual users. In pattern recognition, a distinction is made between several different types of actions, for example types of grip, with the controller being continuously supplied with EMG data. At each point in time, the probability of the user wishing to perform a certain action or a certain type of grip is calculated. The action with the highest probability is executed. The problem here lies in the high computational effort and the fact that another action cannot be initiated from every action just executed or from every state.

The object of the present invention is to make available a method for controlling an actuator of an orthopedic device that is robust and at the same time has improved control accuracy.

According to the invention, this object is achieved by a control method having the features of the main claim. Advantageous embodiments and developments of the invention are disclosed in the subclaims, the description and the figures.

In the method according to the invention for controlling at least one actuator of an orthopedic device, with an electronic control device which is coupled to the actuator and to at least one sensor and has an electronic processor for processing sensor data, at least one state machine being stored in the control device, in which states of the orthopedic device and state transitions of the actuator are determined and on the basis of which a decision is made concerning the manner of activation or deactivation of the actuator as control signal, provision is made that a classification is stored in the control device, in which sensor data and/or states are automatically classified in a classification process, the state machine and the classification process being used in combination, and, on the basis of the states and classification, a decision is made concerning the manner of activation or deactivation of the actuator as control signal. By combining the control of an actuator of an orthopedic device via a state machine with a classification process or with one or more classifiers, it is possible in advance to reduce the number of options to be classified and to limit the data evaluation to those aspects that are relevant for the selection between two or more practicable options. If an orthopedic device, for example a prosthesis, is already clearly in a certain state or during a certain movement situation, this state or this situation can exclude a large number of further fundamental possibilities for changing this state or this movement situation. If, for example, a prosthetic hand is already in a position with a lateral grip, in which the thumb already bears on the index finger, the only other reasonable commands that can be performed are closing of the remaining fingers or opening of the lateral grip, which greatly reduces the classification effort. In addition, the decisions as to how the actuator is activated or deactivated or the actuators are activated or deactivated can be made with greater accuracy and possibly more quickly, since a classification can be carried out very easily and very quickly in the fully developed state.

In a variant of the invention, provision is made that sensor signals are fed as input parameters to the classifier and then as classified sensor data to the state machine. Alternatively, the sensor signals can be fed as input parameters to the state machine and from there as a state to the classifier. From the sensor data or features, the classifier calculates the probabilities of the associated classes and can feed these to a state machine. On the basis of these classified sensor data, the state machine can then more precisely infer the next state or can supply signals. If sensor signals are initially fed as input parameters to the state machine, some states can be excluded as existing or future states, and therefore they can be ignored in the classification.

The class boundaries can also be simplified, which can increase the quality of the decisions. The classifier and state machine are then arranged one behind the other with respect to the processing of the sensor data, and the processed sensor data, whether as classified sensor data or as a state, are then fed to the respective other module or the respective other device.

It is also possible that sensor data are fed both to the classifier and the state machine and are processed in the respective device. The state machine and the classifier are then combined with each other, such that, in addition to the sensor data, the classifier is supplied with sensor data processed by the state machine in the form of one or more states, from which a corresponding control signal is then jointly generated. Alternatively, in addition to the sensor data, classified sensor data from the classifier are fed to the state machine in order to jointly generate a corresponding control signal therefrom.

In a further development of the invention, provision is made that several classification processes are stored in the classifier, and that the state machine feeds a determined state as an input variable to the classifier.

The output of the classifier can be fed back to the input of the classifier via the state machine, as a result of which classified sensor data based on sensor data with a state calculated or determined therefrom are fed back via the state machine. To determine the state, sensor data can also be supplied so that the state machine feeds the current state back to the classifier and thus changes its parameters and structure or exchanges the classifier, i.e. selects one of the several classification processes stored in the classifier, depending on the state. The control signals in such a data flow, in which a classifier calculates the probabilities of the associated classes from the sensor data or features and feeds them to the state machine, which then in turn carries out a feedback to the classifier, can take place via the classifier or the state machine, possibly also via both devices, i.e. both via the classifier and via the state machine. For example, different actuators can be activated or deactivated by the respective control signals.

The state machine can thus use the sensor data and the results of the classifier to generate a feedback signal which changes at least one parameter of the classifier, which selects a different classification process or which is fed to the classifier as the current state. The control signal itself can be generated in the state machine and/or the classifier.

Several classification processes can be carried out simultaneously in the classifier, and each classification process can have different goals. This makes it possible to analyze several scenarios at the same time, and the respective probabilities.

The selection of the respective classifier or its parameterization can be made depending on the current state. This includes, for example, the type of classifier, its structure or its parameterization. The type of classifier can be the closest neighbor classification, for example, or can take place according to the hidden Markov model or other methods. The structures of the classifier can also be changed, for example by feedback from the state machine, which feeds the current state back to the classifier and thereby changes its structure. Alternatively, the classifier can be exchanged through the feedback, i.e. another classifier can be selected in order to reduce the number of possible next steps. The selection of the classification process or the parameterization of the classifier can take place as a function of the current state. The change in the structure can, for example, affect the number of classes, the arrangement of the layers and/or the number of neurons. A change in the number of classes takes place in a neural network, for example. The parameterization of the classifier can, for example, relate to the change in weighting and/or the variances.

In a further development of the invention, provision is made that the state machine makes discrete decisions, which is particularly advantageous when a decision has to be made from only a few alternatives. The parameters that are used for the decision are preferably unambiguous, for example measured values and also outputs of a classifier that are compared with limit values. If a measured value reaches a limit value or if it exceeds the limit value, a discrete decision is made for a previously determined measure to be used. Once a limit value has been reached, the state machine can make a decision as to whether an actuator or drive is activated or deactivated, whether a specific control program is activated or whether the orthopedic device must be brought into a specific mode. Alternatively, the state machine can make decisions based on fuzzy quantities, for example if profiles of several measured values are evaluated and the combination of the measured values lies in a range to which a certain decision or a certain state of the control, the orthopedic device or the like is assigned.

A control signal can be configured as a continuous or piece-wise function of classifier results. The output of a classifier can indicate the probability of a certain event or of a certain state occurring. In relation to an EMG control, this could be the detection of a co-contraction, in which the value 0 indicates that a co-contraction is unlikely, while the value 1 represents a very high probability of a co-contraction. If two oppositely acting muscles are tensed at the same time beyond a minimum intensity value and it is detected at the same time that no movement is triggered by the muscle contractions, the probability of a co-contraction is very high and is used with 1. If only one of the two muscles is tensed and a movement about a joint axis is detected, the probability of an intended co-contraction is extremely low or 0. All values in between indicate the strength of the co-contraction.

The parameterization of the classifier or of the classifiers can take place, for example, by removal of at least one class. It can thereby be achieved that the measured values have to be assigned to a smaller number of classes or that certain measured values are so far outside the respective decision space that they no longer have to be taken into account. The reduction of the classes can lead to a separation of the decision spaces, as a result of which the decision of the classifier can be made more clearly.

In one variant of the invention, it is possible for the result of the classifier to be fed to the state machine as an input variable. If the state machines are used to control orthopedic devices such as prostheses or orthoses, especially of the lower extremity, it is possible with these algorithms to bring about certain behaviors. For example, dampers are activated or deactivated, valves are opened or closed, or drives are switched on or off. The transition between the individual states usually takes place on the basis of comparisons of sensor values and/or calculated variables and also their logical combination. The sensor values or calculated variables are compared with limit values which are generated, for example, using fixed values, characteristic curves and characteristic areas. Using the result of the classifier, it is possible to provide the state machine with an input variable on the basis of which a distinction is made.

As soon as two states are differentiated, it is a state machine.

In a classifier, sensor data are classified by at least one classification process, and at least one parameter of the classifier can be changed as a function of at least one internal state and/or a physical state of the orthopedic device. An internal state is, for example, a state machine, which outputs a state as a result, software, or an internal feedback loop. A physical state of the orthopedic device is, for example, a geometric condition, for example an angle between two components, a positioning of components with respect to one another, which for example identifies a certain type of grip of a prosthetic hand, or existing forces. For example, electrical states such as voltage, current, resistance or the like are also to be regarded as physical states.

The invention also relates to an orthopedic device with an electronic control device which is coupled to an actuator and to at least one sensor and has an electronic processor for processing sensor data, with at least one classification based on sensor data or on data calculated therefrom being effected in the control device, wherein the classification process depends on the state of the orthopedic device. The orthopedic device is designed in particular as a prosthesis or orthosis and in particular implements the method described above. The control device activates or deactivates the actuator on the basis of programs that are stored in a memory unit within the control device. The electronic processor processes sensor data or data calculated therefrom. These can be, for example, temporal derivations or links between individual data or data records. For example, stored geometric data in connection with angles and/or accelerations can be used to calculate positions, speeds and other variables which serve as the basis for controlling the orthopedic device. At least one classification based on the sensor data or the data calculated therefrom takes place in the control device, the classification process depending on or being influenced by the state of the orthopedic device. The classification process can be influenced, or a corresponding classification process selected, via the state of the orthopedic device, which state is determined by the sensor data or by data calculated therefrom. The selection is made from classification processes that are stored in the control device.

Exemplary embodiments of the invention are explained in more detail below with reference to the accompanying figures, in which:

FIGS. 1 to 4 show different arrangements and sequences of classifiers K and state machines SM, which are supplied with sensor data s or with classified sensor data k or with states z, in order to send a signal to a processor or microcontroller μC, via which the further control of the orthopedic device, which is not shown in any more detail, is to be carried out.

Figure 1:
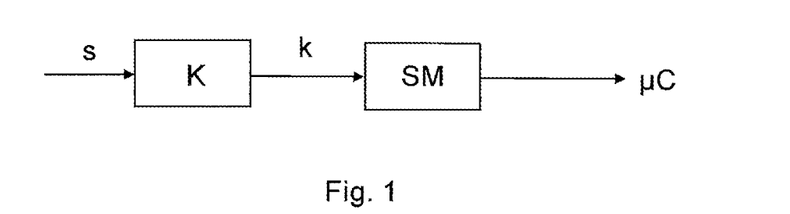
FIG. 1 shows a first series connection of classifier and state machine.

In FIG. 1, the classifier K is arranged in series with the state machine SM. The original sensor data s are first fed to the classifier K and processed therein. The classifier K calculates the probabilities of the associated classes from the sensor data s or features and feeds the sensor data k thus classified to the state machine SM. In this exemplary embodiment, the state machine SM then no longer processes the original sensor data s, but already processed sensor data, such that, based on said processed sensor data or classified sensor data k, a distinction is made within the state machine SM with regard to the current state of the orthopedic device. On the basis of the established or fixed state, a control signal or a corresponding signal is then transmitted to the microcontroller μC, via which corresponding actuators are then activated or deactivated.

Figure 4:
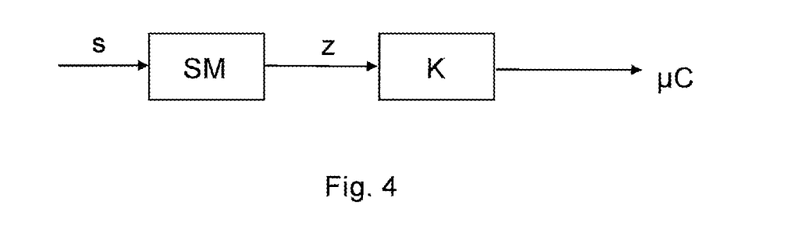
FIG. 4 shows an activation of the state machine and classifier.

FIG. 4 shows a reversal of the order in which the original sensor data s are processed in comparison with FIG. 1. The original sensor data s are first fed to the state machine SM. In the state machine SM, it is possible to evaluate these sensor data and to predict the possible next state changes or considerably reduce the number of the possible next state changes. This is achieved through the network structure of the state machine SM and the associated and implemented knowledge of the current state of the orthopedic device. These states z or this state are/is transmitted to the downstream classifier K, which transmits a signal therefrom to the microcontroller μC or processor in order then to carry out the further control measures. With such a configuration and combination of a classifier K with a state machine SM, the classifier K does not always have to classify all data or features, but calculates the probabilities only from the options that appear to be practicable and that have been selected by the state machine SM. For example, if a prosthetic hand is in the "lateral grip" state, then there are only two options for a further command, namely "close lateral grip" or "open lateral grip".

Figure 2:
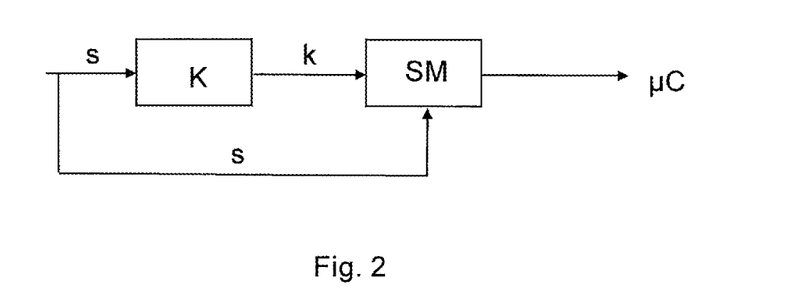
FIG. 2 shows a variant of FIG. 1, with parallel application of sensor data to the state machine.

In FIG. 2, analogously to the procedure in FIG. 1, the sensor data s are first fed to the classifier K, from which the classified sensor data k are then fed to the state machine SM. However, the classified sensor data k are not the sole input variables of the state machine SM; rather, the original sensor data s are also transmitted to the state machine SM, such that the state machine SM also used, in addition to the classified sensor data k, raw sensor data or otherwise processed sensor data in order to determine the respective state and the associated measure. The state machine SM can thus make better decisions on the basis of additional information that is made available by the classifier K.

Figure 3:
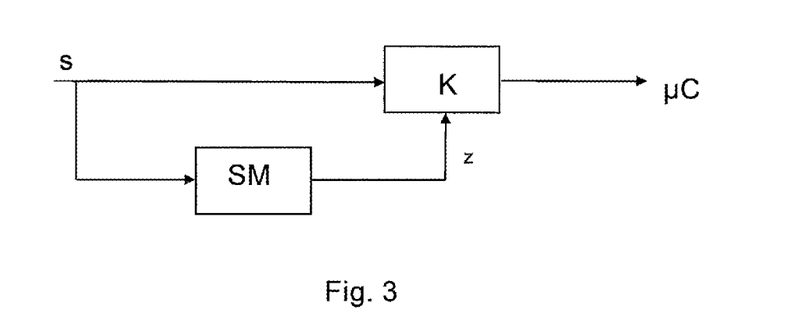
FIG. 3 shows a parallel connection of classifier and state machine, with classifier state input.

A similar structure of the combination of a state machine SM and a classifier K is shown in FIG. 3 in which, in addition to the sensor raw data s, state data z from the state machine SM are also transmitted to the classifier K. It is possible that the state machine SM does not just use state data or states z as further influencing variables to influence the classifier K, but also changes in the classes within the classifier K.

Figure 5:
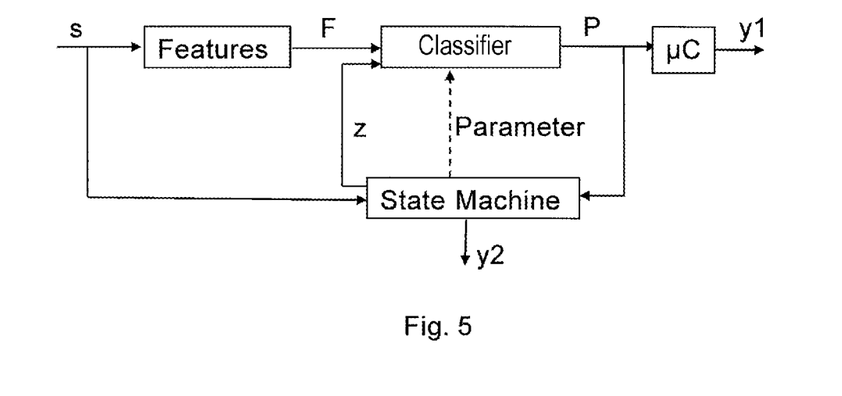
FIG. 5 shows the data flow with a feed-back classifier.

FIG. 5 shows the data flow of a combination of a classifier K with a feedback state machine SM. Features F are derived for the specific classifier K from the sensor raw data s. In addition, the sensor raw data s are sent directly to the state machine SM. Probabilities P are calculated in the classifier K from the features F. These probabilities P are fed to the state machine SM as an input variable. The state machine SM can use the probabilities P or classified sensor data z to generate an output signal y2, on the basis of which the orthopedic device, for example the prosthesis, can be controlled. The state machine SM runs through different states Z on the basis of the history of the input signals and the results of the classifier K. In the simplest case, the state Z corresponds exactly to the class with the highest probability. The current state Z can now be fed directly as an input to the classifier K. Alternatively, the state machine SM influences the classifier K in that its parameters are modified or different classifiers K are selected. The respective state z, which was generated on the basis of the sensor raw data s and possibly the classified sensor data from the feedback with the classifier K, can be fed to the classifier K from the state machine SM. The classified sensor data can then be passed through a microcontroller μC to control the orthopedic device.

The parameterization and the selection of different classifiers K make it possible to use the optimal and leaner classifier K in each case for different decisions. In addition to influencing state transitions in the state machine SM, the classifiers K can also be used to influence the control within a state. If, for example, the closing of a prosthetic hand is specified as the state, the way in which the hand is closed can be influenced via a classifier K. On the basis of the sensor raw data, the classifier generates further control signals, which are used either via a microcontroller μC or directly to an actuator to influence the orthopedic device. In principle, it is also provided that several classifiers K are executed at the same time, but each classifier K has different goals. When the classifiers K have been completely developed, they work very simply and quickly and can be executed in parallel without significantly increasing the computational effort.

Figure 6:
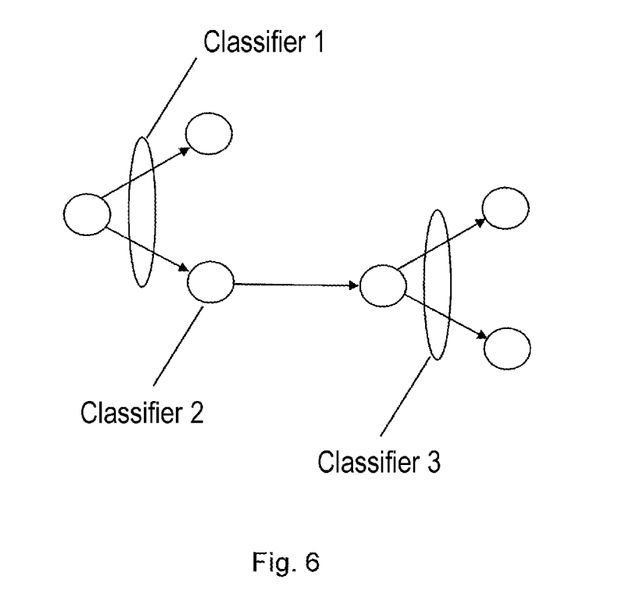
FIG. 6 shows different classifiers.

Specific classifiers K and their selection are shown schematically in FIG. 6. The respective classifier K is selected, for example, as a function of the current state, which is fixed via a state machine SM. The parameterization of the respective classifier K can likewise be selected or changed as a function of the current state of the control or of the orthopedic device. The structure of the classifier can likewise be varied as a function of the respective state, for example the number of classes, number of neurons, arrangement of the layers and the like.

Figure 7:
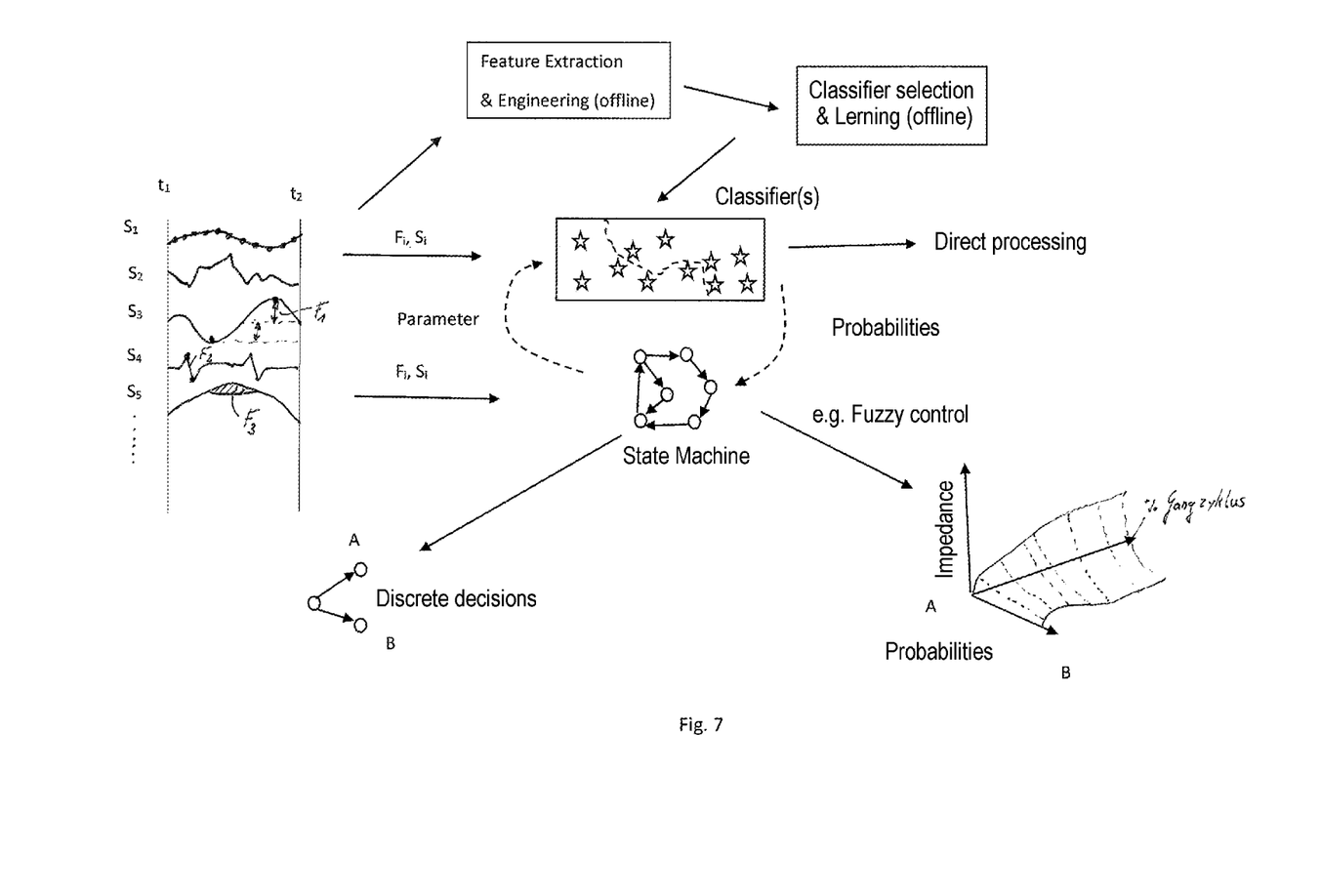
FIG. 7 shows an example of the data flow of an expanded state machine.

The data flow of an expanded state machine SM is shown in FIG. 7. The central component of the expansion of the state machine SM is a library of generally parameterizable classifiers that are coupled to the state machine SM. The respective classifiers can be optimized for their specific task using feature engineering, feature extraction and machine learning. In principle, it is also possible for a plurality of state machines SM to be coupled to the library of classifiers. The state machine SM or the respective state machine SM and also the respective classifier K or also several classifiers K communicate with one another during the period of use and exert an interaction on one another during the running time, such that the two components interact dynamically with each other over the running time. The respective state machine SM selects those classifiers K as a function of the state or the respective parameter set which is best suited to optimally solve the currently pending decision. On the left, next to the combination of classifier K and state machine SM, the courses of the different sensor signals s are shown, for example forces, moments, myoelectric signals, angle courses or the like. The features F derived therefrom are sent to the classifiers or the classifier K. The calculated probabilities within the classifier K are sent to the state machine SM, the states Z are sent to the classifier K in order to change the parameters within the classifier K. In the state machine SM, for example, discrete decisions are made, that is to say certain states Z exist; alternatively, decisions are made on the basis of probabilities or approximations, so-called fuzzy control. In principle, it is also possible for the processed features to be used by the classifier K directly for control.

An example of a control is the movement control of a prosthetic hand, in which, for example, two types of grip A and B can be implemented. In principle, both types of grip A or B can be performed from the open position of the prosthetic hand, whereas, with a closed or partially closed prosthetic hand, only the opening of the prosthetic hand is possible. As soon as the prosthetic hand begins, for example, to perform the type of grip A and to close the prosthetic hand, on the basis of a classification result, it is only necessary for further control to distinguish between type of grip A and opening. The other grip type B can be neglected in the classification. The class boundaries are accordingly simplified. The second type of grip B is included in the decision-making process again only after the prosthetic hand has been fully opened. In the case of a conventional control with only one classifier, the second type of grip B could also be recognized during the closing and opening of the first type of grip A, as a result of which the closing or opening of the prosthetic hand would need to have been interrupted.

In order to rule this out, the control method according to the invention provides, for example, that the current state, namely the type of grip currently present, is returned as a feature F to the classifier K, by which means the feature space is expanded by a unique feature. A distinction is made between the adopted state of the prosthesis, namely the respective type of grip and the open state, and the last recognized class. Alternatively, it is possible to change the parameters of the classifier K over the running time, if a certain state has been recognized, for example by removing a class from the classifier K.

Figure 8:
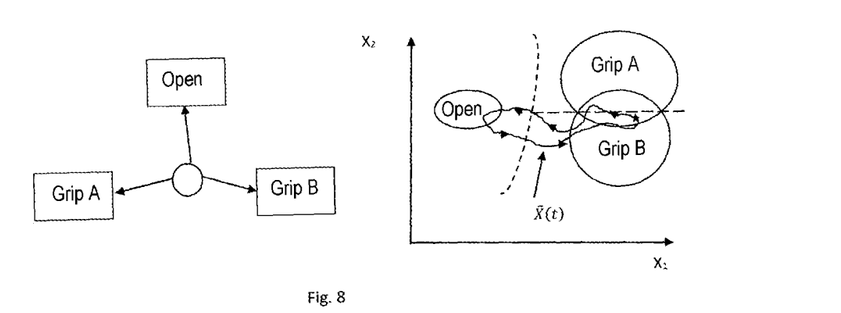
FIG. 8 shows a diagram of a classification problem with no state restriction.
Figure 9:
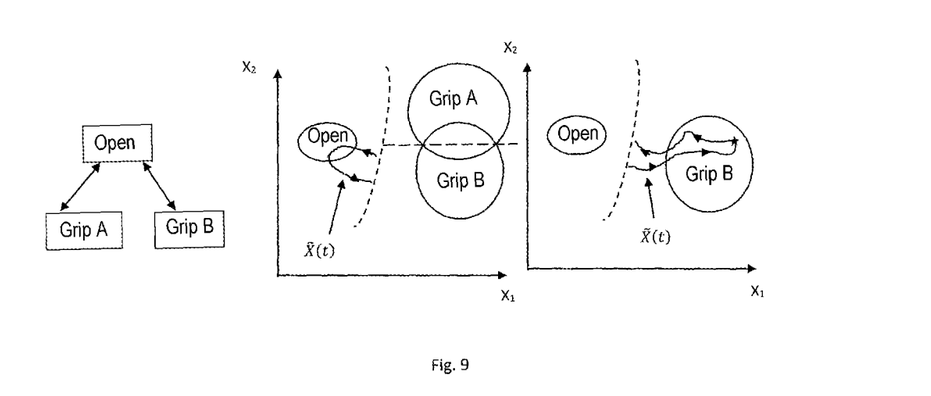
FIG. 9 shows a diagram of a classification problem with state restriction.

This example is explained in more detail with reference to FIG. 8 and FIG. 9. In FIG. 8, there is no restriction of a state in the state machine SM. Therefore, a distinction has to be made at each time between all the existing classes, namely prosthetic hand open, grip A and grip B. Due to the lack of a sharp separation between the two grip types A and B in the feature space x1-x2, incorrect classifications may occur. The classification Open→Grip B→Grip A→Grip B→Open may be output over the course of time of the feature vector. In the case of a combination of a classifier K with a state restriction via the state machine SM, as is shown in FIG. 9, the distinction between grip type A and grip type B only has to be made initially. When performing grip type B, a distinction only needs to be made between gripping and opening. The class for the grip type can be ignored. The reduction of the classes results in a much simpler classification problem. The plotted time course of the feature vector can only lead to the correct classification Open→Grip B→Open.

Figure 10:
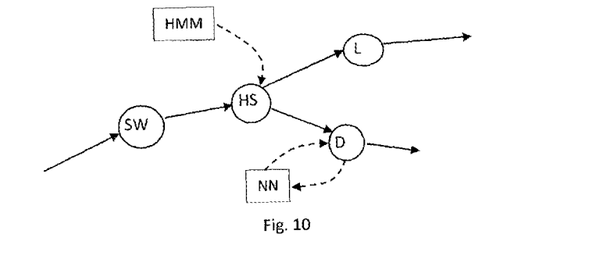
FIG. 10 shows a diagram of an expanded state machine.

FIG. 10 shows an expanded state machine SM which can be used to control a prosthetic knee joint or orthotic knee joint. First of all, two classifiers are used to make local decisions of a state machine SM. After the end of a swing phase sw, with the heel strike HS, a hidden Markov model (HMM) is used to determine whether a transition to walking on the level L or to walking downward D is controlled. For walking downward D, a neural network NN is again used, the output of which forms an argument in a control characteristic area. Both classifiers HMM and NN are highly specialized and are used locally, depending on the current state—walking on the level or walking downward—for a typical discrete decision.

When walking on the level, walking down a slope or walking down stairs with an artificial knee joint, different flexion resistances have to be approached. This is achieved by combining a state machine SM with an assignment of the gait phases in combination with classifiers K. First of all, the trajectory of the foot is recorded in the swing phase and, in the event of a heel strike HS, is fed to a hidden Markov model, possibly in a simplified mathematical representation. The hidden Markov model can use the trajectory to differentiate whether the step concerned is a flat step or a downward step. The output probabilities of the hidden Markov model are the basis for branching into two different branches of the state machine. The first branch is for walking on the level, the second for downward steps. Once a decision has been made to walk downward, a distinction must be made between walking on a ramp and descending stairs. The neural network NN is used for this purpose. The courses of the segment angles of the prosthesis or orthosis and the loads after the heel strike HS, for example, serve as input variable s. The outputs in the form of probabilities for descending stairs or walking downhill on a ramp are not used in this case for a further branching of the state machine, but as input parameters of a control characteristic area which, from the probabilities and the knee angle, calculates the flexion resistance that is necessary for the respective movement scenario.

The combination or entanglement of classifiers K with state machines SM thus has advantages over the respectively isolated application of these components. Particularly in the case of pattern recognition of electromyographic signals or other neural signals of the upper extremity, it is advantageous to add a state machine to the control of a prosthesis. Likewise, the tried and tested state machine control of the lower extremity can easily be supplemented with a classifier-based control component.

For all of the exemplary embodiments and for all of the controls and variants described, it is provided that the classifiers are designed to be self-learning or can be designed to be self-learning. Self-learning classifiers can, for example, use a cluster analysis to independently carry out or evaluate a class formation for an unclassified set of feature vectors and in doing so take into account their own classification results.

Figure 11:
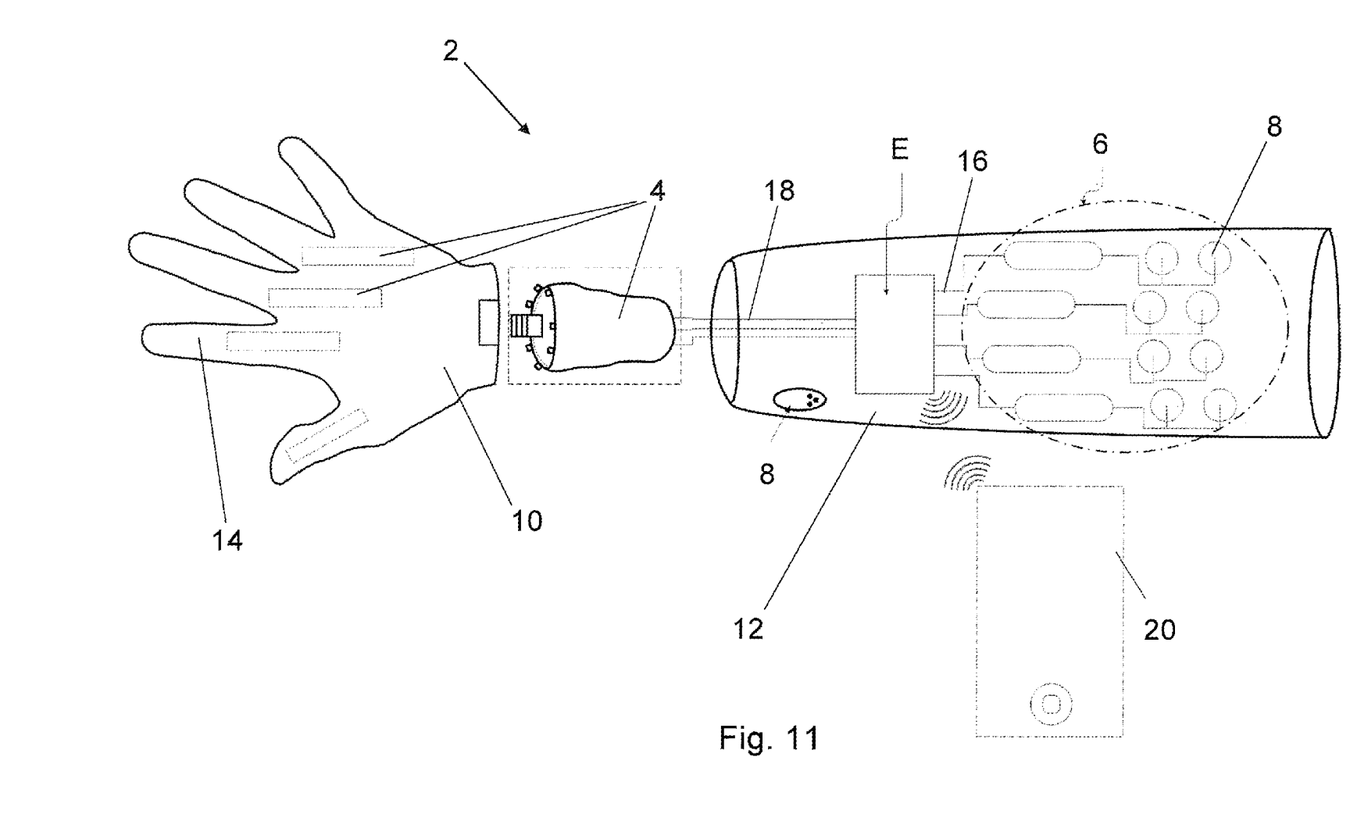
FIG. 11 shows a schematic representation of a prosthesis of an upper extremity.

FIG. 11 shows a schematic representation of an embodiment of the orthopedic device 2 in the form of an actuatable prosthesis device of a lower extremity. The prosthesis device 2 is partially shown along its longitudinal axis in the manner of an exploded view. The prosthesis device 2 is designed as a prosthetic lower arm and has several actuators 4 in the form of electromotive drives, a sensor arrangement 6 with a plurality of electrode pairs 8, and a control device E in the form of an electronic data processing device.

The drive 4 shown to the right in FIG. 11 is used to rotate a prosthetic hand 10 of the prosthesis device 2 relative to a forearm socket 12 of the prosthesis device 2 about the longitudinal axis of the forearm socket 12. In addition, the prosthetic hand 10 has a plurality of further drives or actuators 4 within the prosthetic hand 10, which are used to actuate the prosthetic fingers 14 of the prosthetic hand 10.

The sensor arrangement 6 has four electrode pairs 8. These are designed, for example, as individual electrode pairs 8, each of which can be attached to the skin of a prosthesis wearer. According to a further embodiment, the electrode pairs 8 are applied to a prosthesis liner (not shown), for example glued on, or connected to or formed integrally with a liner. According to a further embodiment, the electrode pairs 8 are arranged on an inner side of the forearm socket 12.

The electrode pairs 8 are each connected to the control device E via sensor lines 16. The signals detected by the electrodes are passed to the control device E via the sensor lines 16.

The signals are evaluated in the control device E. In addition to the illustrated electrode pairs 8 as sensors for detecting myoelectric signals, other sensors 8 are arranged on the forearm socket and can be designed as inertial sensors, IMU, spatial position sensors, acceleration sensors, force sensors, angle sensors, temperature sensors or other sensors. A plurality of sensors 8 can also be arranged on the orthopedic device, which sensors detect different measured variables or conditions. Likewise, sensors 8 can be arranged in the prosthetic hand, for example position sensors that detect the position of the prosthetic fingers.

In the embodiment shown in FIG. 11, only one of the schematically depicted drive lines 18 is used for the actuator 4 shown. The other drive lines 18 are passed through this or are attached to other lines and supply the other actuators in the form of the motor drives 4 in the prosthetic hand 10 for actuating the phalanges 14.

In the present case, the control device E is in wireless communication, for example via radio, with an input device 20. Signals received from the sensor arrangement 6, for example, can be visualized via this input device 20. In addition, it is preferably possible to change the programs, classifiers K or state machines SM stored in the control device E.

Figure 12:
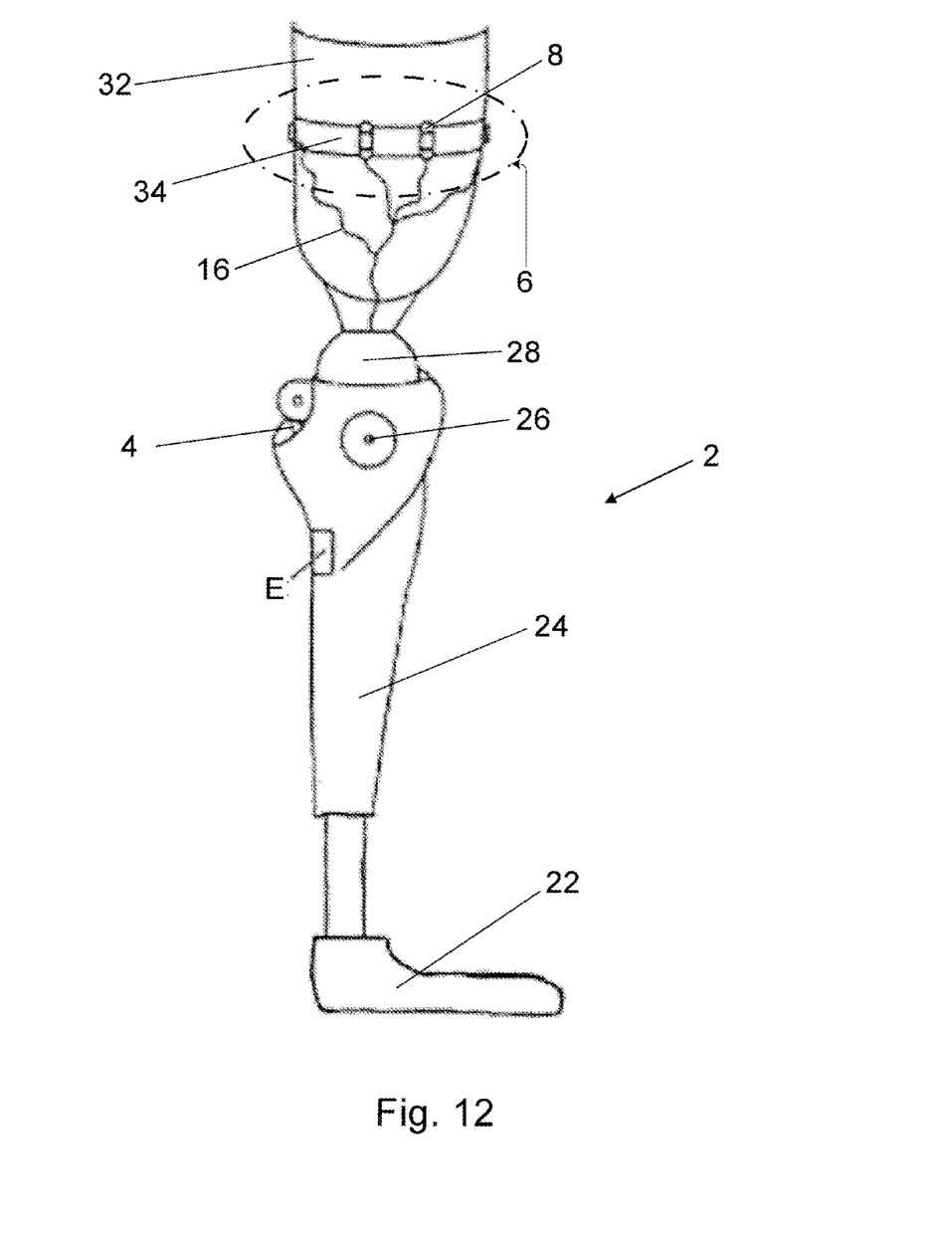
FIG. 12 shows a schematic representation of a prosthetic leg.

FIG. 12 shows a further embodiment of the orthopedic device 2, here in the form of a prosthetic leg for a thigh amputee patient. The prosthesis device 2 has a sensor arrangement 6 with several, for example six, electrode pairs 8, only four of which are visible in FIG. 12.

The prosthesis device 2 has a prosthetic foot 22 and a lower-leg part 24. A prosthetic knee joint 26, which has an upper part 28, is arranged on the lower-leg part 24. A damper serving as actuator 4 is assigned to the prosthetic knee joint 26. Drives or actuators for adjusting valves or for setting other manipulated variables can be arranged in the damper itself. Actuators are not limited to electric motors, but are generally used to influence and/or change properties or positions of components of the orthopedic device. A prosthesis socket is arranged on the joint upper part 28; however, for the sake of clarity, it is not shown in FIG. 12. Instead, the underlying limb stump 32 of a prosthesis wearer is indicated.

The prosthetic knee joint 26 can also be assigned an active drive (not shown) as an actuator, which actuates a flexion and/or extension movement of the prosthesis device 2. Control signals from the control device E are sent to this drive via drive lines 18, which are likewise not shown.

The sensor arrangement 6 has a flexible, in particular elastic belt 34 on which the electrode pairs 8 are arranged. This belt is arranged around the limb stump 32, such that the electrode pairs 8 rest on it and can accordingly detect signals. The other sensors 8 mentioned in connection with FIG. 11 can likewise be arranged on the prosthetic leg and/or the stump and connected to the control device. In addition to prostheses, orthopedic devices within the meaning of the invention also include in particular orthoses and exoskeletons.

The invention claimed is:

1. A method for controlling at least one actuator of an orthopedic device, comprising:
   providing an electronic control device which is coupled to the at least one actuator and to at least one sensor, wherein the electronic control device comprises an electronic processor for processing sensor data from the at least one sensor, and at least one state machine stored in the electronic control device in which states of the orthopedic device and state transitions of the actuator are determined,
   automatically classifying in a classification process using a classifier stored in the control device sensor data and/or states of the orthopedic device, wherein the at least one state machine and the classification process are used in combination;
   selecting the classification process from amongst several classification processes, or parameterizing the classifier, wherein the selecting or parameterizing takes place as a function of a current state of the states of the orthopedic device determined by the at least one state machine;
   feeding an output of the classifier as an input to the at least one state machine and a determined state directly back as an input to the classifier; and
   signaling the at least one actuator with a control signal for activation or deactivation on the basis of the classification and the states of the orthopedic device.

2. The method as claimed in claim 1,
   wherein signals from the at least one sensor are fed
   as input parameters to the classifier and as classified sensor data to the at least one state machine, or
   as input parameters to the at least one state machine and as states of the orthopedic device to the classifier.

3. The method as claimed in claim 1 further comprising supplying both the at least one state machine and the classifier with the sensor data of the at least one sensor as input parameters.

4. The method as claimed in claim 1, further comprising storing several classification processes in the classifier, and wherein the at least one state machine feeds a determined state as an input variable to the classifier.

5. The method as claimed in claim 1, wherein a feedback signal is generated in the at least one state machine
   from the sensor data, and
   from results of the classifier and
   wherein the feedback signal changes at least one parameter of the classifier, wherein the classifier selects a different classification process, or
   wherein the feedback signal is fed to the classifier as a current state of the current states of the orthopedic device.

6. The method as claimed in claim 1 wherein the control signal is generated in the at least one state machine and/or in the classifier.

7. The method as claimed in claim 1 wherein the automatically classifying step performs several classification processes simultaneously, and wherein each classification process of the several classification processes can have different goals.

8. The method as claimed in claim 1 wherein the one or more state machines make discrete decisions or make decisions on the basis of fuzzy logic or fuzzy sets.

9. A method for controlling at least one actuator of an orthopedic device, comprising:
   providing an electronic control device which is coupled to the at least one actuator and to at least one sensor, wherein the electronic control device comprises an electronic processor for processing sensor data from the at least one sensor, at least one state machine stored in the control device in which states of the orthopedic device and state transitions of the actuator are determined,
   automatically classifying in a classification process using a classifier stored in the control device sensor data and/or states of the orthopedic device, wherein the at least one state machine and the classification process are used in combination;
   parameterizing the classifier by removal of one or more classes;
   feeding an output of the classifier as an input to the at least one state machine and a determined state directly back as an input to the classifier; and
   signaling the at least one actuator with a control signal for activation or deactivation on the basis of the classification and the states of the orthopedic device.

10. An orthopedic device, comprising:
    an electronic control device;
    an actuator, wherein the electronic control device is coupled to the actuator; and
    at least one sensor, wherein the electronic control device is coupled to the at least one sensor,
    wherein the electronic control device comprises an electronic processor for processing sensor data and at least one state machine stored in the electronic control device in which states of the orthopedic device and state transitions of the actuator are determined,
    wherein the electronic control device is configured to perform at least one classification based on the sensor data of the at least one sensor or on data calculated therefrom,
    wherein the electronic control device selects a classification process for the at least one classification which depends on a state of the orthopedic device, or parameterizes at least one classifier by removal of one or more classes, and
    wherein the electronic control device is configured to feed an output of the at least one classification as an input to the at least one state machine and a determined state directly back as an input to the at least one classification.

* * * * *